Oct. 4, 1966　　　L. A. LALLY ETAL　　　3,276,271
MICROSYN MODIFICATION

Filed May 9, 1963　　　　　　　　　　　　　　2 Sheets-Sheet 1

INVENTOR.
LEONARD A. LALLY
CHARLES P. DAVIS
PAUL B. BOSWELL
BY
Arthur L. Collins
ATTORNEY Oct. 4, 1966

L. A. LALLY ETAL 3,276,271

MICROSYN MODIFICATION

Filed May 9, 1963

INVENTOR.
LEONARD A. LALLY
CHARLES P. DAVIS
PAUL B. BOSWELL

BY

*Arthur L. Collins*

ATTORNEY

United States Patent Office 3,276,271
Patented Oct. 4, 1966

3,276,271
MICROSYN MODIFICATION
Leonard A. Lally, Pittsfield, Mass., Charles P. Davis, San Luis Obispo, Calif., and Paul B. Boswell, Pittsfield, Mass., assignors, by mesne assignments, to the United States of America as represented by the Secretary of the Navy
Filed May 9, 1963, Ser. No. 279,675
5 Claims. (Cl. 74—5.6)

The present invention relates to novel and improved electromagnetic apparatus and more particularly to novel and improved apparatus for detecting and measuring angular movement from a preselected reference axis.

In various types of servomechanisms and other control systems the gyroscope is often used in combination with a suitable electromagnetic device to provide an electrical output signal whenever the gyro assembly rotates from a preselected neutral or null position or attitude. Thus, when the gyro assembly is rotated about its input axis, gyroscopic action produces a torque which rotates a rotor affixed to the output shaft of the gyroscope. Electromagnetic interaction between the rotor and a fixed stator assembly in turn produces a proportionate output potential. Although many such electromagnetic devices or signal generators have been employed in such a manner with gyroscopes in the past, considerable difficulty has been experienced heretofore in providing a generator which is highly sensitive and precise for use in systems of this general character.

It is therefore a principal object of the present invention to provide a novel and improved signal generator to be used with a gyroscope device to sense angular movement from a preselected reference axis.

It is a further object of the present invention to provide a novel and improved signal generator which applies a minimal undesired torque upon the gyro system with which it is used.

Other objects and many of the attendant advantages of this invention will be readily appreciated as the same becomes understood by reference to the following detailed description when considered in connection with the accompanying drawings wherein.

Figure 1:
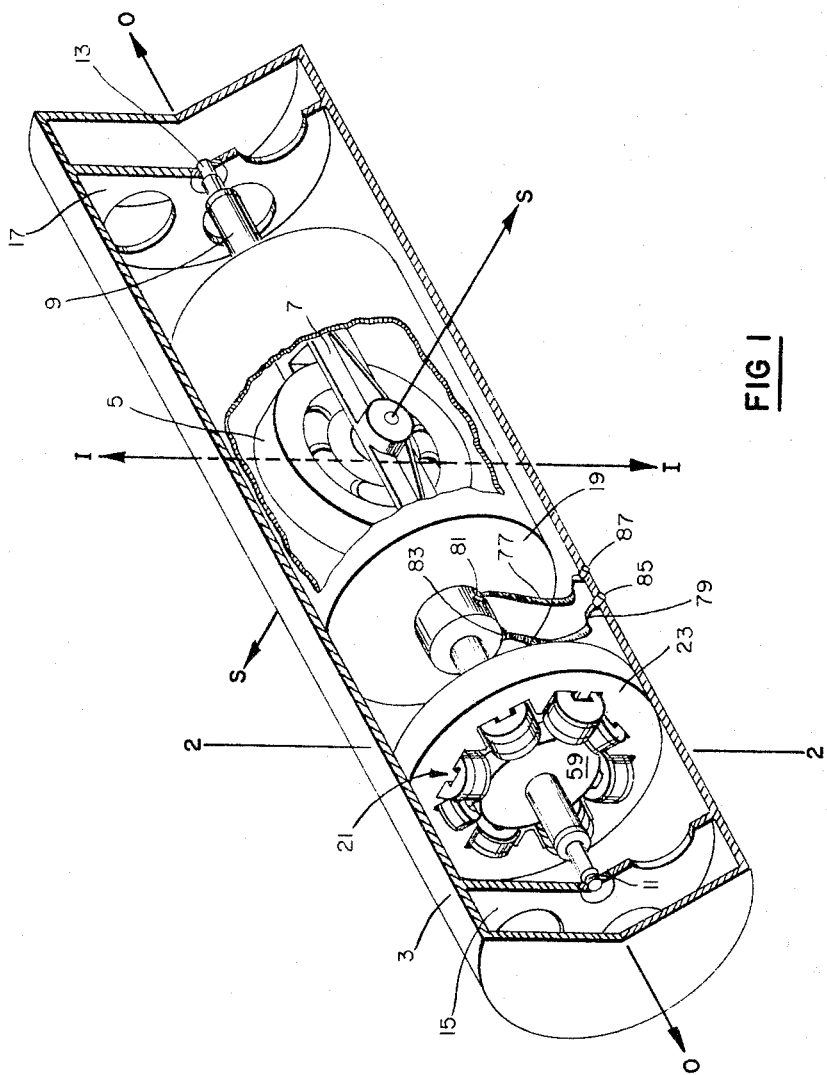
FIGURE 1 is a partly cutaway view of a preferred embodiment of the present invention.

Referring to the drawings it will be observed that the illustrated gyroscope includes an outer housing 3 oriented such that its longitudinal axis coincides with the output axis O—O of the gyroscope. The single degree of freedom rotor 5 of the gyroscope is mounted in a frame 7 that is rigidly secured to the shaft 9. Shaft 9 is supported for rotation about the output axis on the combination jewel and thrust bearings or the like 11 and 13 positioned in the internal support partitions 15 and 17 within the housing. Rotor 5 is driven at a constant high speed about its spin axis S—S in any suitable conventional manner. The rotor assembly is enclosed in a hollow hermetically sealed cylinder 19 which is secured as shown to shaft 9 and floated by a viscous fluid within housing 3.

Figure 2:
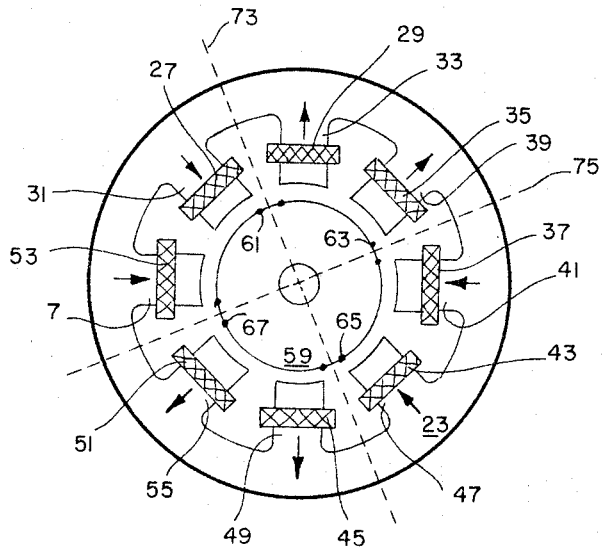
FIGURE 2 is a cross sectional view along reference line 2—2 of the embodiment of the invention shown in FIGURE 1.
Figure 3:
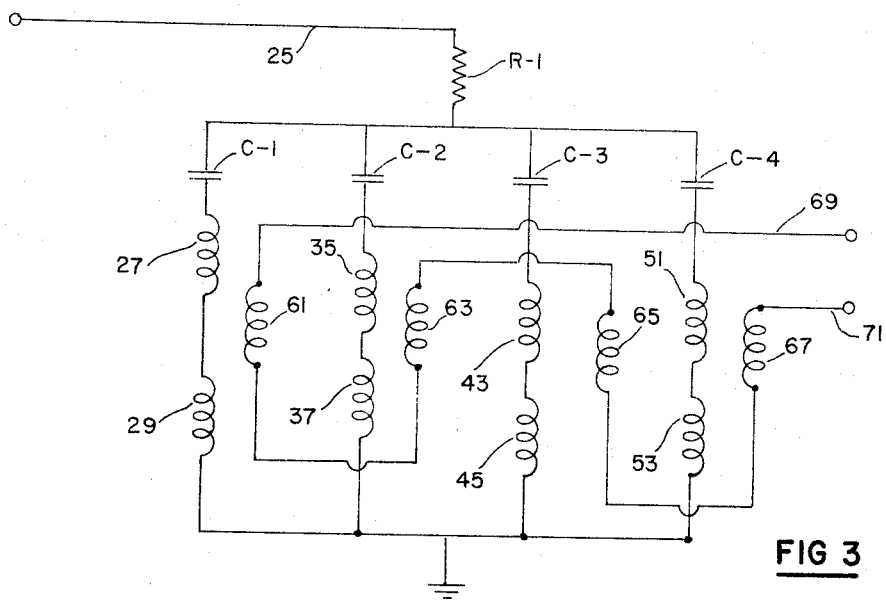
FIGURE 3 is a diagrammatic view of the electrical circuit of the signal generator shown in FIGURE 1.

The improved signal generator 21 of the invention is positioned within housing 3 between the gyro rotor assembly and partition 15. The stator 23 of the generator is secured to the inner peripheral surface of housing 3 and includes a plurality of pole pieces that extend inwardly therefrom. The pole pieces have concave inner surfaces and define a suitable central bore within the stator. A primary winding is mounted on each of the pole pieces and is energized by a suitable source of alternating current on conductor 25 through a resistor and a capacitor which tunes each circuit to approximately 60% resonance. Thus, windings 27 and 29 on pole pieces 31 and 33 are energized by a circuit that extends from the alternating current source successively through conductor 25, resistor R–1, condenser C–1, and the series connected windings 27 and 29 to ground. Windings 35 and 37 on pole pieces 39 and 41 are energized by a circuit that extends from the source successively through conductor 25, resistor R–1, condenser C–2, and series connected windings 35 and 37 to ground. Windings 43 and 45 on pole pieces 47 and 49 are energized by a circuit that extends from the source successively through conductor 25, resistor R–1, condenser C–3, and the series connected windings 43 and 45 to ground. Windings 51 and 53 on pole pieces 55 and 57 are energized by a circuit that extends from the source successively through conductor 25, resistor R–1, condenser C–4, and the series connected windings 51 and 53 to ground. Windings 27, 37, 43, and 53 are wound on their respective pole pieces so as to develop a magnetomotive force in the manner shown by the arrows in FIGURE 2 of the drawing inwardly toward the bore whereas windings 29, 35, 45, and 51 are wound so as to develop a magnetomotive force in the opposite direction outwardly away from the bore. The rotor 59 of the signal generator 21 is secured to shaft 9, is cylindrical in contour and is preferably of such length along the shaft that it extends a predetermined distance beyond each extremity of the stator 23. The rotor windings 61, 63, 65, and 67 are preferably positioned in the quadrature relationship shown in FIGURE 2 of the drawing on the surface of the rotor and are electrically connected in series between output conductors 69 and 71. Windings 61 and 65 are each symmetrically wound about an interpolar axis 73 on rotor 59 and develop a magnetomotive force inwardly toward the center of the rotor. Windings 63 and 67 are symmetrically wound about an interpolar axis 75 which is perpendicular to the axis 73 and they develop a magnetomotive force outwardly away from the center of the rotor 59. Flexible conductors 77 and 79 which permit limited angular movement of the shaft 9 within housing 3 with an incidence of minimum torque extend between suitably insulated electrical connectors 81 and 83 on the shaft and similarly insulated connectors 85 and 87 on the housing.

In operation when the gyroscope assembly is angularly positioned in a preselected manner on its input axis I—I, the rotor 59 of the signal generator 21 occupies its null position where the interpolar axis 73 of rotor windings 61 and 65 is disposed midway between the center lines of oppositely magnetized pole pieces 31 and 33 and midway between the center lines of oppositely magnetized pole pieces 47 and 49. Similarly, in the null position the interpolar axis 75 is disposed midway between the center lines of oppositely magnetized pole pieces 39 and 41 and midway between the center lines of oppositely magnetized pole pieces 55 and 57. In this null position equal and opposite potentials are developed in each of the rotor windings and no net output potential is developed across output conductors 69 and 71. When the gyroscope assembly rotates in either direction about its input axis from its preselected position, a torque is developed on shaft 9 which rotates the rotor 59 of signal generator 21 from its null position. When this occurs, adjacent air gap areas between the rotor winding and the stator poles are no longer substantially identical with the result that the flux linkages in the rotor winding due to the stator excitation are unbalanced. Thus as the air gap areas respectively between stator windings 27, 35, 43, and 51 and rotor windings 61, 63, 65, and 67 diminish and as air gap areas respectively between stator windings 29, 37, 45, and 53 and rotor windings 61, 63, 65, and 67 increase, potentials are developed in the rotor windings. These potentials combine additively to produce an output potential on conductors 69 and 71 having a polarity dependent upon the direction of rotation from the null position and a magnitude proportional to the amplitude of the angular variation from the null.

Use of the cylindrical type rotor in the signal generator 21 has been found to be particularly advantageous. More specifically, by positioning the output windings of the generator about the peripheral surface of the rotor, the mechanical and magnetic dissymmetry of the conventional rotor with its protruding pole faces is avoided. In this way inaccuracies produced by nonlinear torques applied to the gyroscope as the angular disposition of the rotor varies are minimized.

Although the present invention has been described hereinabove as it might be applied for use with the signal generator of a gyro system, it is to be understood that it could also be adapted for use in a torque generator of a gyro system or in any other suitable environment without departing from the spirit or scope of the invention.

It is also to be understood that although four rotor windings and eight stator windings are shown in the signal generator of the above described embodiment of the invention, any suitable greater or smaller number of rotor and stator windings could be used without departing from the spirit or scope of the invention.

Obviously many modifications and variations of the present invention are possible in the light of the above teachings. It is therefore to be understood that within the scope of the appended claims the invention may be practiced otherwise than as specifically described.

What is claimed is:
1. An electromagnetic device comprising:
  (a) a salient pole stator;
  (b) a cylindrical rotor mounted for rotation within the stator;
  (c) a winding mounted on the surface of the rotor for each pair of poles on the stator, the extended axis of each winding being normally disposed midway between its respective pair of poles on the stator;
  (d) means for developing opposite magnetomotive forces in each pair of poles of the stator;
  (e) and means for electrically connecting the rotor windings in series so that the potentials developed therein additively combine.
2. An electromagnetic device comprising:
  (a) a salient pole stator;
  (b) a winding disposed about each pole of the stator;
  (c) energizing circuits for the windings disposed about adjacent pairs of poles of the stator, each said energizing circuit developing opposite magnetomotive forces within adjacent pairs of poles;
  (d) a cylindrical rotor mounted for rotation within the stator;
  (e) a winding mounted on the surface of the rotor for each said pair of adjacent poles on the stator, the extended axis of each rotor winding being normally disposed midway between its respective pair of poles on the stator;
  (f) and means for electrically connecting the rotor windings in series so that the potentials developed therein additively combine.
3. An electromagnetic device comprising:
  (a) a salient pole stator;
  (b) a winding disposed about each pole of the stator;
  (c) energizing circuits for the windings disposed about adjacent pairs of poles of the stator, each said energizing circuit developing opposite magnetomotive forces within adjacent pairs of poles;
  (d) means for tuning each said energizing circuit to substantially 60% resonance;
  (e) a cylindrical rotor mounted for rotation within the stator;
  (f) a winding mounted on the surface of the rotor for each said pair of adjacent poles on the stator, the extended axis of each rotor winding being normally disposed midway between its respective pair of poles on the stator;
  (g) and means for electrically connecting the rotor windings in series so that the potentials developed therein additively combine.
4. Gyroscopic apparatus comprising:
  (a) a housing;
  (b) a shaft rotatably mounted in the housing for limited rotation about an output axis;
  (c) an electrically driven gyroscope mounted for rotation about a spin axis normal to said output axis;
  (d) a cylindrical rotor mounted on the shaft;
  (e) a salient pole stator mounted in the housing adjacent said cylindrical rotor;
  (f) a winding disposed about each pole of the stator;
  (g) energizing circuits for the windings disposed about adjacent pairs of poles of the stator, each said energizing circuit developing opposite magnetomotive forces within adjacent pairs of poles;
  (h) a winding mounted on the surface of the rotor for each said pair of adjacent poles on the stator, the extended axis of each rotor winding being normally disposed midway between its respective pair of poles on the stator;
  (i) and means for electrically connecting the rotor windings in series so that the potentials developed therein additively combine.
5. Gyroscopic apparatus comprising:
  (a) a housing;
  (b) a shaft rotatably mounted in the housing for limited rotation about an output axis;
  (c) an electrically driven gyroscope mounted for rotation about a spin axis normal to said output axis;
  (d) a cylindrical rotor mounted on the shaft;
  (e) a salient pole stator mounted in the housing adjacent said cylindrical rotor;
  (f) a winding disposed about each pole of the stator;
  (g) energizing circuits for the windings disposed about adjacent pairs of poles of the stator, each said energizing circuit developing opposite magnetomotive forces within adjacent pairs of poles;
  (h) means for tuning each said energizing circuit to substantially 60% resonance;
  (i) a winding mounted on the surface of the rotor for each said pair of adjacent poles on the stator, the extended axis of each rotor winding being normally disposed midway between its respective pair of poles on the stator;
  (j) and means for electrically connecting the rotor windings in series so that the potentials developed therein additively combine.

References Cited by the Examiner
UNITED STATES PATENTS
2,924,978  2/1960  Barnes _____ 74—5
FOREIGN PATENTS
839,770  7/1960  Great Britain.

FRED C. MATTERN, Jr., *Primary Examiner.*
BROUGHTON G. DURHAM, *Examiner.*
T. W. SHEAR, P. W. SULLIVAN, *Assistant Examiners.*